United States Patent
Day et al.

(10) Patent No.: US 7,392,928 B2
(45) Date of Patent: Jul. 1, 2008

(54) WELDING PROCESS FOR LARGE STRUCTURES

(75) Inventors: Roger Anthony Day, Bristol (GB); David John Tighe, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 11/021,466

(22) Filed: Dec. 22, 2004

(65) Prior Publication Data

US 2006/0027631 A1 Feb. 9, 2006

(30) Foreign Application Priority Data

Dec. 23, 2003 (GB) ................... 0329898.1

(51) Int. Cl.
B23K 20/12 (2006.01)

(52) U.S. Cl. .................... 228/112.1; 228/2.1
(58) Field of Classification Search .............. 228/112.1, 228/2.1

See application file for complete search history.

(56) References Cited

U.S. PATENT DOCUMENTS

| 5,273,806 | A | * | 12/1993 | Lockshaw et al. | ........... 428/167 |
| 5,305,505 | A | | 4/1994 | Ruhlman | |
| 6,051,325 | A | * | 4/2000 | Talwar et al. | ............... 428/593 |
| 6,450,394 | B1 | * | 9/2002 | Wollaston et al. | ........ 228/112.1 |
| 6,581,819 | B1 | * | 6/2003 | Aota et al. | ............... 228/112.1 |
| 6,582,539 | B2 | * | 6/2003 | Iwanczyk et al. | .......... 156/73.5 |
| 6,793,118 | B2 | * | 9/2004 | Palm | ....................... 228/112.1 |
| 2003/0075584 | A1 | * | 4/2003 | Sarik et al. | .................... 228/2.1 |
| 2003/0201306 | A1 | | 10/2003 | McTernan et al. | |

FOREIGN PATENT DOCUMENTS

| EP | 0 501 831 A1 | | 9/1992 |
| EP | 0 698 442 A2 | | 2/1996 |
| EP | 0 893 190 A3 | | 1/1999 |
| GB | 1064399 | * | 12/1965 |
| GB | 1064399 | | 4/1967 |
| GB | 1114423 | | 5/1968 |
| GB | 1499192 | | 1/1978 |

* cited by examiner

*Primary Examiner*—Kevin P. Kerns
*Assistant Examiner*—Michael Aboagye
(74) *Attorney, Agent, or Firm*—Patterson, Thuente, Skaar & Christensen,, P.A.

(57) ABSTRACT

There is provided a method for welding together two metal components to form a large structure suitable for use as an aerospace component. The method comprises the steps of providing two metal components to be welded together, each component having a length, a width, a height and a surface to be welded, the surface to be welded of at least one of the metal components including a feature extending substantially the length of the component, the feature reducing the contact width of the surfaces to be welded of the two components to less than the width of each component; and welding together the components. There is also provided a large structure so created. There is also provided a method for welding together two metal components to form a part or a whole of a spar for a wing for an aircraft and a spar so created.

16 Claims, 4 Drawing Sheets

WELDING PROCESS FOR LARGE STRUCTURES

BACKGROUND OF THE INVENTION

This invention relates to a method of welding together two metal components to form a large structure which may be suitable for use as an aerospace component and to a large structure so created. In this context, an aerospace component means one that forms part of a fixed-wing aircraft, a helicopter, a missile, a satellite, a space structure or the like. The invention relates particularly, but not exclusively, to a method of welding together two large metal components to form a part or a whole of a spar for a wing of an aircraft and to a spar so created.

In many applications it is necessary to weld together two large metal components. In many applications, it is also useful if the two components have different properties, thereby creating a structure having certain properties in one section and different properties in another section. For example, a spar in the wing of an aircraft is subject to forces in its upper section different from those in its lower section and it is therefore advantageous if the two sections are constructed from metals having different properties.

Large aircraft wings are assembled from many components by joining them together with fasteners (examples of which are bolts and rivets). Each wing typically has two main spars, a forward spar and a rear spar, both running the length of the wing. Some large wings also have a centre spar. Each spar has a length, measured in a direction from the joint of the wing and the fuselage to the wing tip, and a height, measured in a direction from the upper surface to the lower surface of the wing (typically being a maximum of the order of 1 to 2 meters in a large transport aircraft, but decreasing steadily along the length of the wing to the wing tip). The spar is relatively narrow along most of its height but the upper and lower portions are of a greater width (typically no more than 200 mm) so that the overall cross-sectional shape of the spar is usually substantially that of a 'C', although other shapes such as an 'I' are possible. The spar is strengthened at regular intervals along its length by stiffeners which are substantially the same height as the spar but have a width greater than the width of the spar away from its top and bottom portions. The stiffeners take the form of plates located transverse to the spar length.

A spar can be constructed from many individual components which are riveted and bolted together (known as a fabricated spar) or from one piece (from plate material, an extrusion or a forged billet) which is then machined (known as an integrally-machined spar). Fabricated spars can be formed from metal components having different properties, which are bolted together. However, fabricated spars are labour-intensive to assemble, requiring the drilling of many holes and the setting of rivets and bolts. They are also expensive because the assembly process requires sophisticated tooling, and they are heavier because of the material overlap and the rivets and bolts. They are also at greater risk of fatigue damage due to the large number of fastener holes. The advantages of integrally-machined spars are that material overlap is minimised and bolts and rivets are not required (thereby reducing the overall weight) and sophisticated tooling is not needed for assembly. However, such spars must be machined from one piece of material, which material must be chosen as a compromise between the requirements at the top of the spar (mainly compressive loads) and the requirements at the bottom of the spar (mainly tensile loads).

An alternative possibility we have considered is that the spar could be formed from two metal components, the metals having different properties, which have been welded together. In this case, the spar could be machined before or after welding. Welding of aerospace structures has to be carried out to the highest standards, and only certain high-quality processes are acceptable. One method that is particularly suitable for welding together metals having different properties is friction stir welding. Friction stir welding is a well-known and useful welding process but is, unfortunately, limited by the depth of welding that can be achieved. Currently the maximum depth of material which can be reliably welded by friction stir welding is about 6 to 10 mm, which makes it apparently unsuitable for welding components of large structures such as spars.

SUMMARY OF THE INVENTION

It is an object of the invention to provide a method for welding together two metal components to create a large structure suitable for use as an aerospace component.

It is a further object of the invention to provide a large structure formed from welding together two components.

According to the invention there is provided a method for welding together two metal components to form a large structure suitable for use as an aerospace component, the method comprising the steps of:

providing two metal components to be welded together, each component having a length, a width, a height and a surface to be welded, the surface to be welded of at least one of the metal components including a feature extending substantially the length of the component, the feature reducing the contact width of the surfaces to be welded of the two components to less than the width of each component; and welding together the components.

By reducing the contact width of the surfaces it becomes feasible to weld together components which would otherwise be difficult or impossible to weld together. Also, since the structure is formed by more than one component, each component can be of smaller cross-section than the whole structure and can therefore be made longer from a given volume of material. This is, for example, advantageous when a large spar of an aircraft wing is being manufactured, since the limits on the volume of a billet of material that can be rolled, forged or extruded mean that it is not feasible to produce a full length spar in one piece. Conventionally the spar is produced in lengths that are joined end to end. By using the present invention, however, each component can be produced in a longer length from a given volume of material reducing or eliminating the need for lengthwise joining of the spar. In certain structures, the invention can give rise to even greater advantages if more than two components are joined together side-by-side to form a very long, single structure.

The large structure may be suitable for use as an aerospace component either with or without further modification. For example, the large structure may need a further treatment step before it is used as an aerospace component; thus it may be a precursor to the aerospace component. Alternatively, the large structure may, when welded, be substantially ready for use as an aerospace component, no further modification being required.

By providing a feature on the surface to be welded of at least one of the metal components, which reduces the contact width between the two components, it is possible to use friction stir welding to join the two components, even when the two components are large. Preferably, the at least one weld has a constant width and extends along the length of the components to be joined. Preferably, the at least one weld has no discontinuities along its length.

In one embodiment, the metal components are billets and the method further comprises the step of machining the large structure after the step of welding together the components. Thus, in this method, the billets are first welded together and then the entire structure can be machined to the required shape.

Where the method further comprises the step of machining the large structure after welding, the billets may be rough machined before the step of welding together the components. In this method, the billets have approximately the required shape before welding but are then machined to the exact shape once the components have been welded together.

The step of machining may include removing at least a part of the at least one weld.

Preferably, the feature in the surface to be welded comprises a recess extending substantially the length of the component. The recess, which may be a rebate, may take any of a wide variety of forms. In one embodiment, the recess is in the form of a central groove extending along substantially the length of one or both of the components. This results in two distinct contact areas either side of the groove, each of which have a width which is less than the width of each component. Each contact area can be welded separately and the reduced width means that the contact areas can be welded by friction stir welding.

The welded areas may be the same or different widths. The width of the groove may be set according to the current friction stir welding weld-depth capability. The welded areas may be at the same height so that the two welds are coincident. Alternatively, the welded areas may be at different heights so that the two welds are offset from one another. Usually, the welded areas will be perpendicular to the height direction, but this need not be the case (particularly with friction stir welds, as friction stir welding can be carried out at any orientation).

In the above-mentioned embodiment, if the method further comprises the step of machining after the step of welding, the step of machining may include removing part of one of the welds. Alternatively, the step of machining may comprise removing all of one of the welds, leaving only one welded area to one side of the groove.

In another embodiment, the recess may be along one side of the surface to be welded, the groove extending along substantially the length of one or both of the components. This results in only one contact area to one side of the groove, which has a width less than the width of each component. Other arrangements may also be envisaged.

The feature may be formed in the component during extrusion of the component. Alternatively, the feature may be formed into the component by machining once the component has been formed.

Preferably, the step of welding together the components comprises friction stir welding. This is advantageous because friction stir welding is ideal for welding together metals having different and even dissimilar properties.

Usually, the metals of each metal component will have different properties. In one embodiment, each metal component comprises a different aluminium alloy. For example, each component may comprise one of 2000 series, 6000 series, 7000 series aluminium alloys or aluminium-lithium alloy.

In one especially preferred embodiment, the large structure is a part or a whole of a spar for a wing of an aircraft. The method of the invention is particularly well suited to the manufacture of spars.

According to the invention, there is also provided a method for welding together two metal billets to form a part or a whole of a spar for a wing of an aircraft, the method comprising the steps of:

providing two elongate metal billets, a surface to be welded of at least one of the metal billets including a rebate extending substantially the length of the billet, the rebate reducing contact width between surfaces to be welded of the two billets to substantially less than the width of each billet; then welding together the billets by means of at least one friction stir weld, to form a precursor of the part or the whole of the spar; then machining the precursor of the part or the whole of the spar to a required shape.

According to the invention there is also provided a large structure suitable for use as an aerospace component comprising:

a first metal component having a first surface;

a second metal component having a second surface; and at least one weld joining the first surface of the first component with the second surface of the second component, wherein the contact width between the first surface of the first component and the second surface of the second component is less than the width of each component.

The large structure may be suitable for use as an aerospace component either with or without further modification.

Preferably, the contact width between the first surface of the first component and the second surface of the second component is less than the width of each component by virtue of the first surface of the first component and/or the second surface of the second component incorporating a recess extending substantially the length of the component.

In one embodiment, the recess may be in the form of a central groove extending along substantially the length of one or both of the components. In this case, there are two distinct welded areas either side of the groove, each of which has a width which is less than the width of each component. Alternatively, the rebate may be in the form of a recess along one side of the surface to be welded, the groove extending along substantially the length of one or both of the components. In that case there is only one welded area to one side of the recess, which has a width less than the width of each component.

Preferably, the at least one weld is a friction stir weld. Alternatively, the at least one weld may be an electron beam or laser beam weld.

In one embodiment, each of the upper and lower metal components comprise aluminium alloy. For example, each component may comprise one of 2000 series, 6000 series, 7000 series aluminium alloys or aluminium-lithium alloy.

The metals of each metal component may be the same, but usually the metals of each metal component have different properties.

In one embodiment, the large structure is a part or a whole of a spar for a wing of an aircraft.

According to the invention, there is also provided a large structure when formed by the method described above.

According to the invention, there is also provided a large structure suitable for use as an aerospace component comprising a plurality of metal components, each component being welded to an adjacent component or components by the method described above.

According to the invention, there is also provided a spar for a wing of an aircraft comprising:

an upper metal component having a lower surface;

a lower metal component having an upper surface; and at least one friction stir weld joining the lower surface of the upper component with the upper surface of the lower component, wherein the contact width between the lower surface of the upper component and the upper surface of the lower component is substantially less than the width of each component.

It will be understood that any features described in relation to one aspect of the invention may also be applicable to another aspect of the invention.

DESCRIPTION OF THE DRAWINGS

An embodiment of the invention will now be described with reference to the accompanying drawings of which.

DETAILED DESCRIPTION

Figure 1:
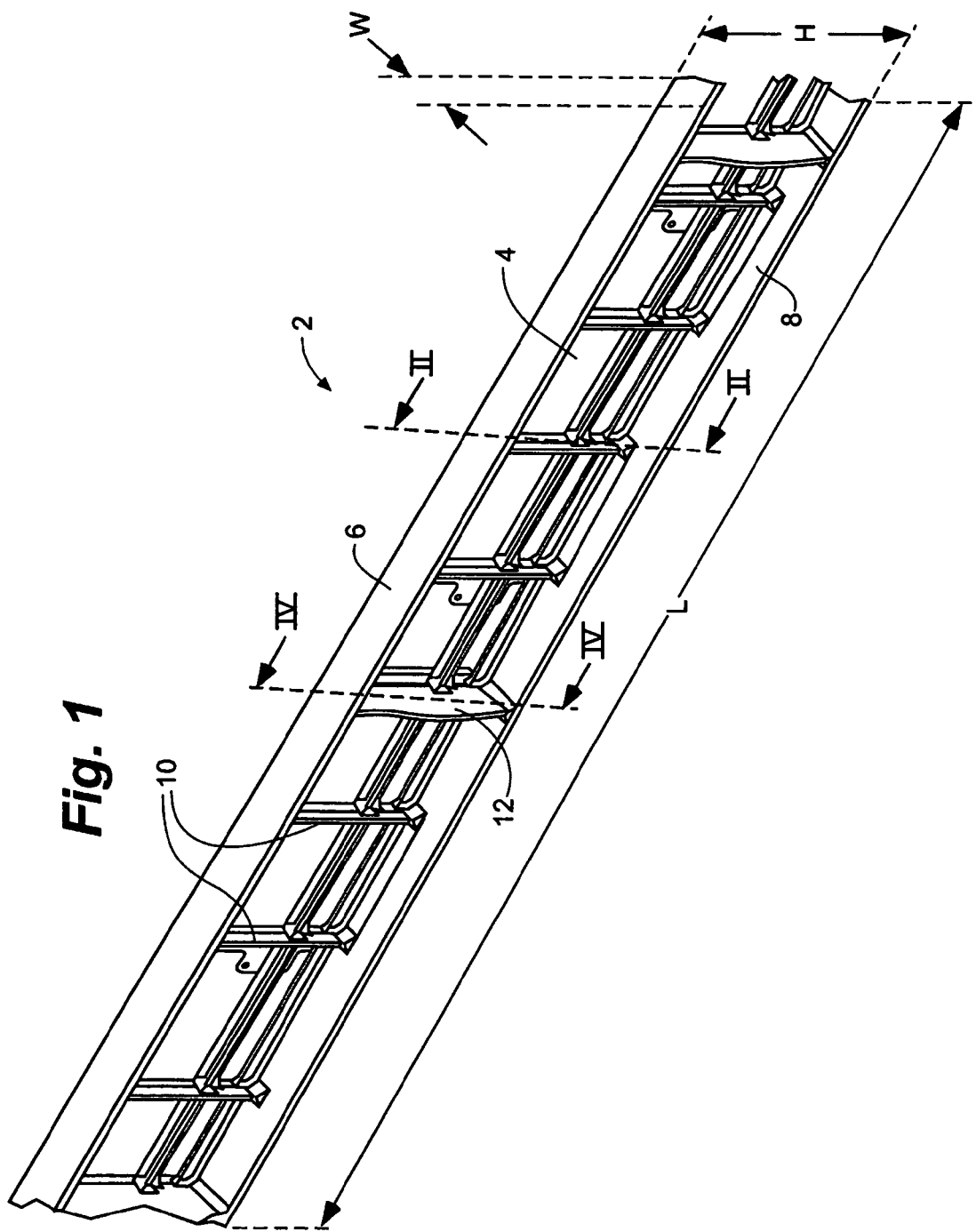
FIG. 1 is a perspective view of a spar section.

FIG. 1 is a perspective view of a section of spar 2. The spar section has a web 4 which is relatively narrow, an upper flange 6 and a lower flange 8. At regular intervals along the length L of the spar are stiffeners 10 for strengthening the spar. The stiffeners 10 are the same height H as the spar but extend further in the width direction W. Thus, the stiffeners appear as plates whose planes are perpendicular to the spar length. It will be seen that the height of the spar section decreases from one end of the spar section to the other. At intervals along the length of the spar, ribs (not shown) are attached to certain of the stiffeners 10 at locations 12.

FIG. 1 shows an integrally-machined spar section. The entire spar is formed from several separately-machined sections (like that in FIG. 1) which are then joined together (e.g. by rivets and bolts), since the size of each section is limited by the volume of material that can be rolled or extruded. The stiffeners 10 are formed into the spar section when the spar section is machined i.e. they are formed from the same continuous piece of material as the rest of the spar section.

Figure 2:
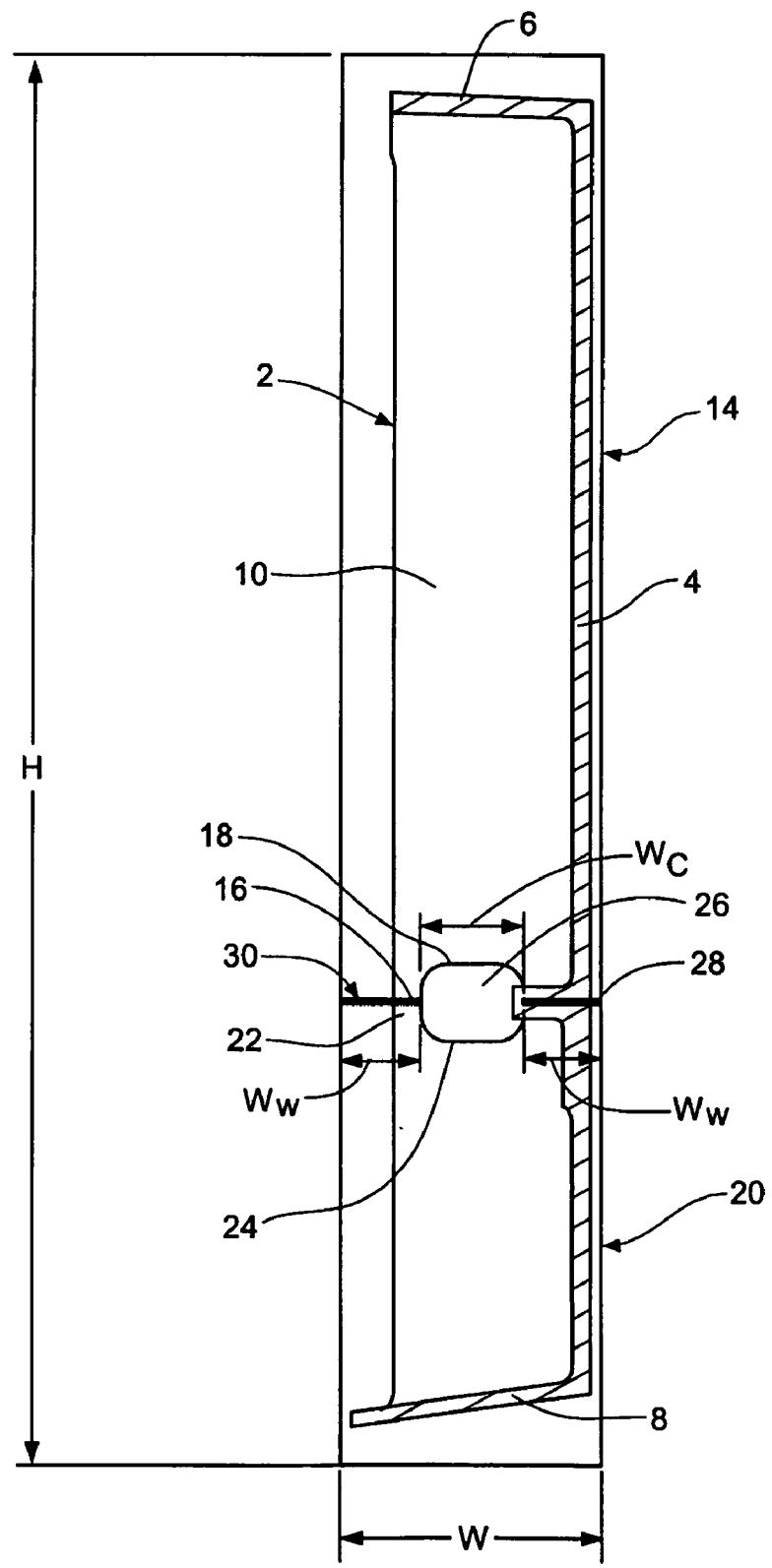
FIG. 2 is a cross sectional view along the line II-II in FIG. 1.

FIG. 2 is a cross-sectional view of the spar taken at line II-II in FIG. 1. FIG. 2 also shows the billets from which the spar has been machined. The outermost lines in FIG. 2 show the outlines of billets 14, 20. Upper billet 14 is formed from Advanced 7000 series aluminium alloy and lower billet 20 is formed from Advanced 2000 series aluminium alloy. In the lower surface 16 of the upper billet 14, there is a central groove 18 running the length of the upper billet 14. In the upper surface 22 of the lower billet 20, there is also a central groove 24 running the length of the lower billet 20. In this embodiment, the feature in the surface to be welded comprises a recess or central groove extending substantially the length of the component. As noted above, a recess, which may be a rebate, may take any of a wide variety of forms including, but not limited to, a central groove extending along substantially the length of one or both of the components. In FIG. 2 the recess is in the form of a central groove extending along substantially the length of both of the components. This results in two distinct contact areas either side of the groove, each of which have a width which is less than the width of each component. Each contact area can be welded separately and the reduced width means that the contact areas can be welded by friction stir welding.

Billets 14 and 20 may be extruded, in which case the groove may be formed as the billet is being extruded. Alternatively, the groove may be machined into the billet once the billet has been formed.

Within the outline of the billets 14, 20, FIG. 2 also shows the resulting spar section 2, having web 4, upper flange 6 and lower flange 8. The spar cross-section is shown cross-hatched. It will be appreciated that the stiffener 10 is plate-like and does not extend far in the length direction whereas the C-shaped cross-section (cross-hatched) extends the length of the spar section in the length direction.

To construct the spar, the billets 14, 20 are placed adjacent so that groove 18 in lower surface 16 of upper billet 14 aligns with groove 24 in upper surface 22 of lower billet 20, forming a central channel 26 having a width $W_c$ extending the length of the resulting structure. Then the two billets are welded together via a first friction stir weld 28 on the right of the channel 26 and a second friction stir weld 30 on the left of channel 26. The first weld 28 is carried out from the right hand side of the billets 14, 20 and has a constant width $W_w$. The first weld 28 extends with constant width $W_w$ and with no discontinuities along the length of the billets. The second weld 30 is carried out from the left hand side of the billets 14, 20 and also has a constant width $W_w$. The second weld 30 extends with constant width $W_w$ and with no discontinuities along the length of the billets. In FIG. 2, the welds are positioned at a height which corresponds to the neutral axis of the spar.

Once the billets have been welded together, resulting in a large structure formed of two sections (the upper section of Advanced 7000 series aluminium alloy, the lower section of Advanced 2000 series aluminium alloy), the large structure is machined to the required shape, like that shown in FIG. 1. It will be appreciated that for most of the structure's length, between the stiffeners 10, the machining will remove all of the second weld 30, resulting in the C-shaped, hatched cross-section shown in FIG. 2. At regular intervals along the length of the spar section, the machining will remove only part of the second weld, leaving the stiffeners 10. The resulting spar section 2 will have a shape like that shown in FIG. 1, each stiffener 10 having a hole of width $W_c$ resulting from channel 26.

Alternatively, the upper and lower billets may be first machined to shape before joining the two machined portions via first weld 28 and second weld 30. Or, the billets may be rough machined, then welded, then more accurately machined.

Figure 3:
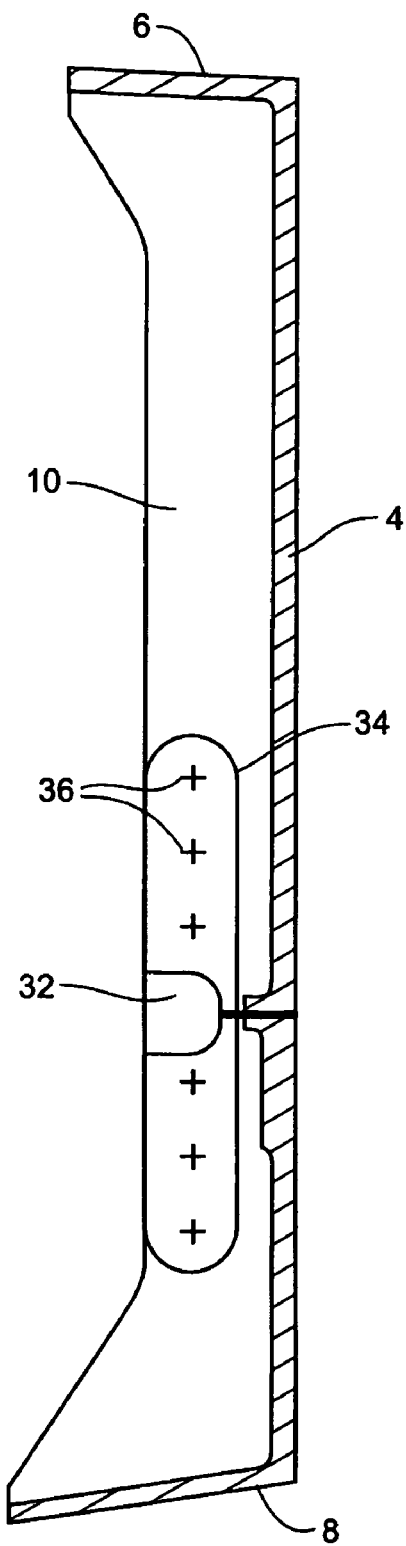
FIG. 3 is a cross sectional view of an alternative spar section.

FIG. 3 is a cross-sectional view of an alternative embodiment of spar, again showing a stiffener 10. Like the embodiment in FIG. 2, the spar section has a web 4, an upper flange 6 and a lower flange 8. Again, the spar cross section is shown cross hatched.

In the embodiment shown in FIG. 3, the stiffener 10 has a smaller width than the stiffener of FIG. 2. Thus, the stiffener 10, rather than having a hole resulting from channel 26, has a cut-out 32. This may be formed by machining away billets 14, 20 shown in FIG. 2 to remove the entire second weld 30 and a part of the channel 26. Alternatively, it may be formed by machining upper and lower billets to shape before welding a single weld to join them. Or, it may be formed by rough machining, followed by welding, followed by more accurate machining.

The stiffener of FIG. 3 is liable to be weaker than that in FIG. 2, so is strengthened by a strap plate 34. Strap plate 34 is attached to the stiffener by rivets 36.

Figure 4:
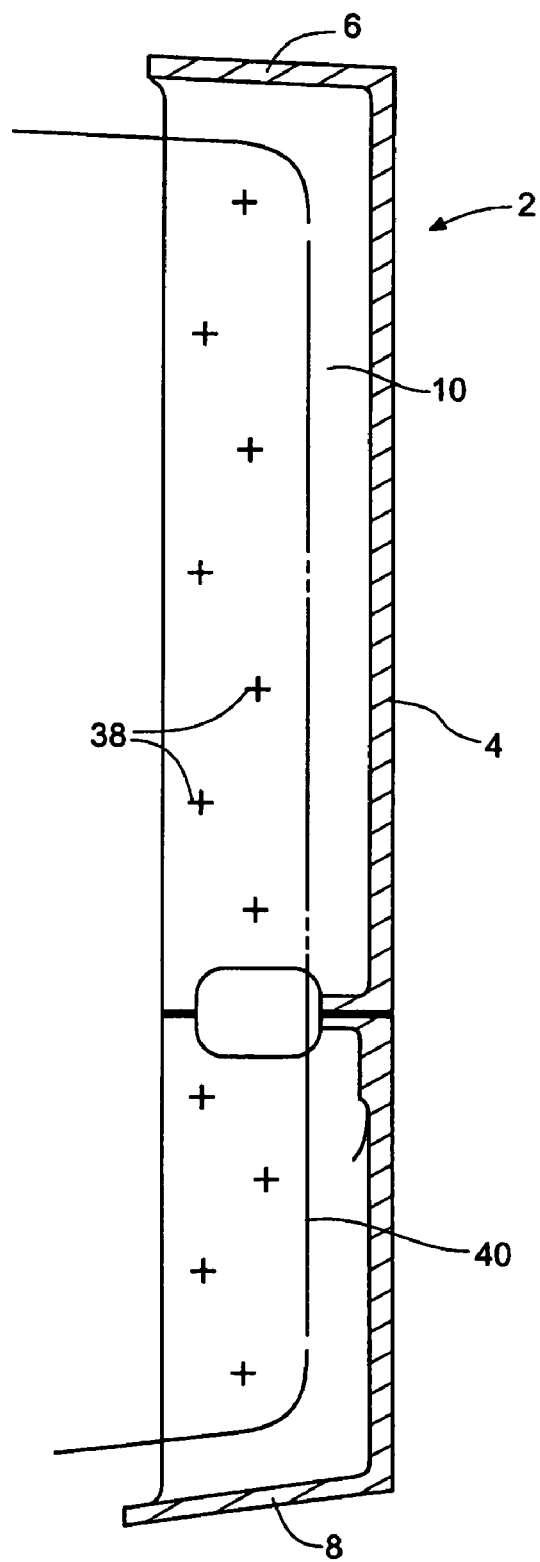
FIG. 4 is a cross sectional view along the line IV-IV in FIG. 1.

FIG. 4 is a cross-sectional view of the spar taken at line IV-IV in FIG. 1. As in FIG. 2, FIG. 4 shows web 4, upper flange 6 and lower flange 8 of spar section 2 as well as stiffener 10. Shown schematically is a rib 40 which is attached to the stiffener by rivets 38. The rib 40 connects the illustrated spar section with an adjacent spar section (not shown) and other components of the wing.

As shown in FIG. 1, usually a rib will not be attached to every stiffener but will only be attached to, for example, every fourth stiffener. In a common arrangement, the stiffeners to which a rib is attached will have a greater width (like the stiffener in FIG. 2) and the intermediate stiffeners will have a narrower width (like the stiffener in FIG. 3). The intermediate stiffeners may or may not be strengthened with strap plates 34. However, other arrangements are possible, for example all the stiffeners could be of the form shown in FIG. 2, or all the stiffeners could be of the form shown in FIG. 3.

The invention claimed is:

1. A method for welding together two metal components to form a large structure suitable for use as an aerospace component, the method comprising the steps of:

providing two metal components to be welded together, each component having a length, a width, a height, a surface to be welded, and a contact width when the surfaces to be welded are brought into contact with one another, the surface to be welded of at least one of the metal components including a feature extending substantially the length of the component, the feature reducing the contact width of the surfaces to be welded of the two components to less than the width of each component;

positioning the two components such that the surfaces to be welded are in contact with one another, thereby forming two distinct contact areas either side of the feature such that a hole oriented lengthwise is defined by the two components at the feature and at at least one location along the length of at least one of the two metal components, the hole including a perimeter; and friction stir welding together the components, wherein at least one stir weld bead extends from the perimeter of the hole, along at least one of the two distinct contact areas either side of the feature, to an exterior surface of at least one component.

2. A method according to claim 1 wherein the metal components are billets and the method further comprises the step of machining the large structure after the step of welding together the components.

3. A method according to claim 2 wherein the billets are rough machined before the step of welding together the components.

4. A method according to claim 2 wherein the step of machining includes removing at least a part of the at least one weld.

5. A method according to claim 1 wherein the feature in the surface to be welded comprises a recess extending substantially the length of the component.

6. A method according to claim 1 wherein the feature is formed in the component during extrusion of the component.

7. A method according to claim 1 wherein the feature is formed into the component by machining.

8. A method according to claim 1 wherein each metal component comprises a different aluminium alloy.

9. A method according to claim 1 wherein the large structure is a spar for a wing for an aircraft.

10. A method for welding together two metal billets to form a part or a whole of a spar for a wing of an aircraft, the method comprising the steps of:

providing two elongate metal billets, the billets each having a length, a width and a height, a surface to be welded of at least one of the metal billets including a rebate extending substantially the length of the billet, the rebate reducing contact width between surfaces to be welded of the two billets to substantially less than the width of each billet;

positioning the two billets such that the surfaces to be welded are in contact with one another, thereby forming at at least one location along the length of the billets, two distinct contact areas either side of the rebate such that a hole oriented lengthwise is defined by the billets at the rebate, the hole including a perimeter; then welding together the billets by means of at least one friction stir weld, wherein at least one stir weld bead extends from the perimeter of the hole, along at least one of the two distinct contact areas either side of the rebate, to an exterior surface of at least one component, to form a precursor of the part or the whole of the spar; then machining the precursor of the part or the whole of the spar to a required shape.

11. A method for welding together two metal components to form a part or a whole of a spar for a wing of an aircraft, the method comprising the steps of:

providing two metal components to be welded together, each component having a length, a width, a height, a surface to be welded extending substantially perpendicular to the height direction, and a contact width when the surfaces to be welded are brought into contact with one another, the surface to be welded of at least one of the metal components including a feature extending substantially the length of the component, the feature reducing the contact width of the surfaces to be welded of the two components to less than the width of each component;

positioning the two components such that the surfaces to be welded are in contact with one another thereby forming two distinct contact areas, each contact area defining a planar interface between the two components, a first contact area on a first side of the feature and a second contact area opposite the first contact area, on a second side of the feature, such that a hole oriented lengthwise is defined by the components at the feature at at least one location along the length of at least one of the two components, each contact area further positioned adjacent the hole; and friction stir welding together the components.

12. A method for welding together two metal billets to form a part or a whole of a spar for a wing of an aircraft, the method comprising the steps of:

providing two elongate metal billets, the billets each having a length, a width and a height, a surface to be welded of at least one of the metal billets including a rebate extending substantially the length of the billet, the rebate reducing contact width between surfaces to be welded of the two billets to substantially less than the width of each billet;

positioning the two billets such that the surfaces to be welded are in contact with one another, thereby forming at at least one location along the length of the billets, two distinct contact areas, a first contact area on a first side of the rebate and a second contact area opposite the first contact area, on a second side of the rebate, such that a hole oriented lengthwise is defined at the rebate between the two billets, the hole including a perimeter; then welding together the billets by means of at least one friction stir weld, to form a precursor of the part or the whole of the spar, wherein at least one stir weld bead extends from the perimeter of the hole, along at least one of the two distinct contact areas either side of the rebate, to an exterior surface of at least one billet; then machining the precursor of the part or the whole of the spar to a required shape, the spar comprising stiffener for supporting a wing rib, and the stiffener including the hole.

13. The method of claim 12 wherein the step of welding together the billets comprises welding the billets at the first contact area.

14. The method of claim 13 wherein the step of welding together the billets comprises welding the billets at the second contact area.

15. The method of claim 11 wherein the step of welding together the billets comprises a first weld at the first contact area that extends from a side of the billet to the rebate.

16. The method of claim 15 wherein the step of welding together the billets further comprises a second weld at the second contact area that extends from a side of the billet to the rebate.

* * * * *